(12) United States Patent
Shin

(10) Patent No.: US 7,277,561 B2
(45) Date of Patent: Oct. 2, 2007

(54) IRIS IDENTIFICATION

(75) Inventor: Sung Bok Shin, Kyong-gi-Do (KR)

(73) Assignee: Qritek Co., Ltd., Seoul (KR)

( * ) Notice: Subject to any disclaimer, the term of this patent is extended or adjusted under 35 U.S.C. 154(b) by 659 days.

(21) Appl. No.: 10/420,813

(22) Filed: Apr. 23, 2003

(65) Prior Publication Data

US 2004/0037452 A1    Feb. 26, 2004

Related U.S. Application Data

(60) Provisional application No. 09/962,751, filed on Sep. 24, 2001, now abandoned.

(30) Foreign Application Priority Data

Oct. 7, 2000    (KR) ............... 2000-59099

(51) Int. Cl.
*G06K 9/00*    (2006.01)
(52) U.S. Cl. .................................................. 382/117
(58) Field of Classification Search ................. 382/117
See application file for complete search history.

(56) References Cited

U.S. PATENT DOCUMENTS

| | | | |
|---|---|---|---|
| 4,641,349 A | 2/1987 | Flom et al. | |
| 5,291,560 A | 3/1994 | Daugman | |
| 5,572,596 A | 11/1996 | Wildes et al. | |
| 5,751,836 A | 5/1998 | Wildes et al. | |
| 5,901,238 A | 5/1999 | Matsushita | |
| 5,956,122 A | 9/1999 | Doster | |
| 5,978,494 A | 11/1999 | Zhang | |
| 6,028,949 A * | 2/2000 | McKendall | 382/117 |
| 6,144,754 A | 11/2000 | Okano et al. | |
| 6,246,751 B1 | 6/2001 | Bergl et al. | |

(Continued)

FOREIGN PATENT DOCUMENTS

| | | |
|---|---|---|
| JP | 2001-292981 | 10/2001 |
| WO | 94/09446 | 4/1994 |
| WO | 98/32093 | 7/1998 |

OTHER PUBLICATIONS

Eric W. Weisstein. "Ellipse." From Mathworld—A wolfram Web Resource. http://mathworld.wolfram.com/Ellipse.html.*

(Continued)

*Primary Examiner*—Bhavesh M Mehta
*Assistant Examiner*—Jonathan Schaffer
(74) *Attorney, Agent, or Firm*—Greenblum & Bernstein, P.L.C.

(57) ABSTRACT

An iris identification system for confirming identity of a person and method thereof are disclosed. The iris identification system comprises a mode converter for selecting one of registration and identification modes, an image input means, a luminance adjustment module, a registration module, an identification module, a reference iris image storage, and a main control unit. The registration module captures iris images when the registration mode is selected, preprocesses the captured iris image, defines the preprocessed iris image as main, auxiliary, negative main and compensation data, encodes the defined data, and registers the encoded data as data of the reference iris images; The identification module captures an iris image when the identification mode is selected, preprocesses the captured iris image, defines the preprocessed iris image as main, auxiliary, negative main and compensation data, encodes the defined data, and analyzes similarity both data.

15 Claims, 10 Drawing Sheets

U.S. PATENT DOCUMENTS 6,247,813 B1 6/2001 Kim et al.
6,289,113 B1 9/2001 McHugh et al.
6,373,968 B2 4/2002 Okano et al.
6,377,699 B1 4/2002 Musgrave et al.
2001/0046311 A1 11/2001 Okano et al.
2002/0001400 A1 1/2002 Yamazaki et al.

OTHER PUBLICATIONS

Eric W. Weisstein. "Circle." From Mathworld—A wolfram Web Resource. http://mathworld.wolfram.com/Circle.html.*

* cited by examiner

IRIS IMAGE
FOR IDENTIFICATION

REFERENCE
IRIS IMAGES

FIG. 7
(A)
PUPIL CONTOUR
(B)
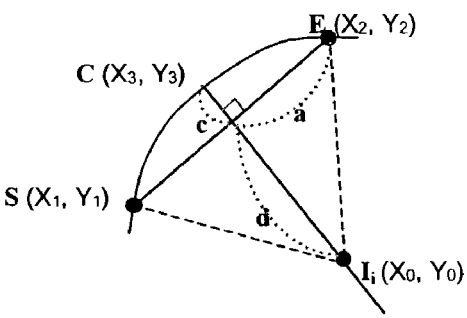
(C)
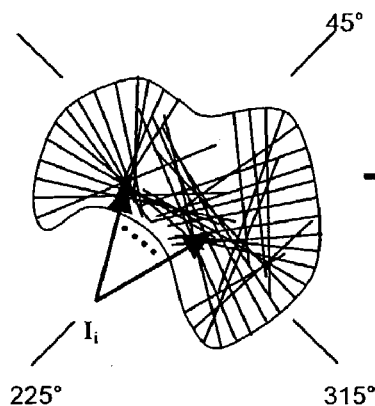
(D)
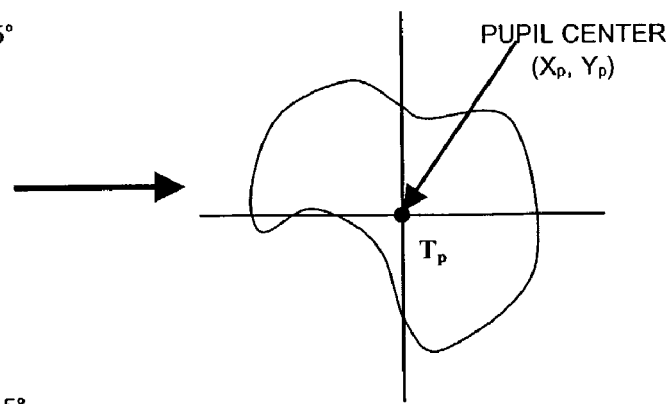

IRIS IDENTIFICATION

This application is a continuation-in-part of application Ser. No. 09/962,751, filed Sep. 24, 2001 now abandoned the entire disclosure of which is expressly incorporated by reference herein in its entirety.

BACKGROUND OF THE INVENTION (a) Field of the Invention

A present invention relates to an iris recognition technology for identifying person and, in particular, to an iris identification system and method, and a computer readable storage medium stored thereon computer executable instructions to implement the iris identification method, that are capable of improving an iris recognition accuracy using reference iris images taken in the various environments.

(b) Description of the Related Art

Recently, various biometric identification technologies using fingerprint, voice, iris, and vein patterns have been developed. Among them, the iris identification technology is known to provide the most secure identification reliability in the security field.

Such an iris identification technology is well known in the art as disclosed by International Publication No. WO94/9446 entitled "Biometric Personal Identification System Based On Iris Analysis."

This prior art discloses the iris identification technique which is performed in such a way of acquiring an image of the eye to be analyzed in digital form suitable for analysis, defining and isolating the iris portion of the image, analyzing the defined area of the image so as to produce an iris code, storing the iris code as a reference code, and comparing a presented code with the reference code to obtain a Hamming distance through the exclusive-OR logical operation. The Hamming distance is used in order to determine the identity of a person and to calculate confidence level for the decision.

However, this prior art has some drawbacks in that it is difficult to consistently adopt the polar coordinates system to the iris identification since the pupil is constricted when exposed to bright light and expanded in dim light (see FIG. 1A) and the constriction/expansion degree to the light differs in every person because each person has his/her own characteristics in sphincter papillae, dilator papillae, intraocular pressure, and etc., such that it is also difficult to predict how an iris characteristic factor of the iris 1 changes when the pupil 2 expands (see FIG. 1B). Referring to FIG. 1B, when an iris image having a characteristic factor 3 is presented and compared with one of the reference iris images, it might be determined that there is no identical reference iris image.

Also, since the iris identification of the prior art divides the iris image so as to define annular analysis portions, this identification accuracy considerably decreases when this technique is used for Asian people whose eye is exposed a little relative to the westerners. If narrowing the analysis band in order to prevent this problem, security reliability is seriously degraded.

Furthermore, this prior art of the iris identification technique has no algorithm capable of preventing misidentification by an inorganic fake iris.

SUMMARY OF THE INVENTION

The present invention has been made in an effort to solve the above problems of the prior art.

It is an object of the present invention to provide an iris identification system and method capable of reducing misidentification rate by taking several reference iris images captured from one eye under various luminance environments and repeatedly comparing an iris image for identification with each of the reference iris images.

It is another object of the present invention to provide an iris identification system and method capable of reducing the analysis error rate regardless of exposure amount of an eye by dividing an iris image into a plurality of blocks having respective priorities so as to analyze the iris image from a block having the highest priority in descendent order.

It is still another object of the present invention to provide a computer readable storage medium stored thereon the computer executable instructions to implement the iris identification method.

To achieve the above objects, the iris identification system for confirming identity of a person, wherein the iris identification system comprising:

a mode converter for selecting one of registration and identification modes;

an image input means for inputting an iris image;

a luminance adjustment module for sequentially selecting predetermined luminance levels when the registration mode is selected by the mode converter and irradiating the light of the selected luminance level together with infrared ray to the eye for iris registration;

a registration module for capturing a plurality of iris images inputted by the image input means whenever the light selected by the luminance adjustment module is irradiated to the eye, preprocessing the captured iris image to decide pupil boundary, pupil center, iris size, and class to which the iris image belongs, defining the preprocessed iris image as main, auxiliary, negative main and compensation data, encoding the defined data, and registering the encoded data as data of the reference iris images;

an identification module for capturing an iris image inputted by the image input means when the identification mode is selected by the mode converter, preprocessing the captured iris image to decide pupil boundary, pupil center, iris size, and class to which the iris image belongs, defining the preprocessed iris image as main, auxiliary, negative main and compensation data, encoding the defined data, and analyzing similarity between the encoded data of the iris image for identification and the encoded data of the reference iris images registered in the registration module;

a reference iris image storage for storing the data of the reference iris images registered in the registration module; and a main control unit for controlling the image input means, the luminance adjustment module, the registration module, the identification module and the reference iris image storage according to the operation mode of the mode converter.

To achieve the above objects, the iris identification method for confirming identity of a person, wherein the method comprising the steps of:

(a) selecting one of registration and identification modes;

(b) inputting an iris image;

(c) sequentially selecting predetermined luminance levels when the registration mode is selected, and irradiating the light of the selected luminance level together with infrared ray to the eye for iris registration;

(d) capturing a plurality of iris images inputted at the step (b) whenever the light selected at the step (c) is irradiated to the eye, preprocessing the captured iris image to decide pupil boundary, pupil center, iris size, and class to which the iris image belongs, defining the preprocessed iris image as main, auxiliary, negative main and compensation data, encoding the defined data, and registering the encoded data as data of the reference iris images;

(e) for storing the data of the reference iris images registered at the step (d);

(f) capturing an iris image inputted at the step (b) when the identification mode is selected at the step (a), preprocessing the captured iris image to decide pupil boundary, pupil center, iris size, and class to which the iris image belongs, defining the preprocessed iris image as main, auxiliary, negative main and compensation data, encoding the defined data, and analyzing similarity between the encoded data of the iris image for identification and the data of the reference iris image stored at the step (e).

To achieve the above objects, the computer readable storage medium stored thereon computer executable instructions to implement an iris identification method for confirming identity of a person, wherein the method comprising the steps of:

(a) selecting one of registration and identification modes;

(b) inputting an iris image;

(c) sequentially selecting predetermined luminance levels when the registration mode is selected, and irradiating the light of the selected luminance level together with infrared ray to the eye for iris registration;

(d) capturing a plurality of iris images inputted at the step (b) whenever the light selected at the step (c) is irradiated to the eye, preprocessing the captured iris image to decide pupil boundary, pupil center, iris size, and class to which the iris image belongs, defining the preprocessed iris image as main, auxiliary, negative main and compensation data, encoding the defined data, and registering the encoded data as data of the reference iris images;

(e) for storing the data of the reference iris images registered at the step (d); and (f) capturing an iris image inputted at the step (b) when the identification mode is selected at the step (a), preprocessing the captured iris image to decide pupil boundary, pupil center, iris size, and class to which the iris image belongs, defining the preprocessed iris image as main, auxiliary, negative main and compensation data, encoding the defined data, and analyzing similarity between the data of the iris image for identification and the encoded data of the reference iris image stored at the step (e).

To perform the iris identification, just one iris image will be taken under any kind of environments (no illumination facilities for identification are needed). The iris image for identification shall be compared with the reference iris images in the reference iris image storage and final decision will be made whether the iris image is approved or denied.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIGS. 7(A), 7(B), 7(C), and 7(D) are drawings for illustrating how a center of the pupil of the iris image is obtained by the registration module;

DETAILED DESCRIPTION OF THE PREFERRED EMBODIMENTS

A preferred embodiment of the present invention will be described hereinafter with reference to the accompanying drawings.

Figure 1A:
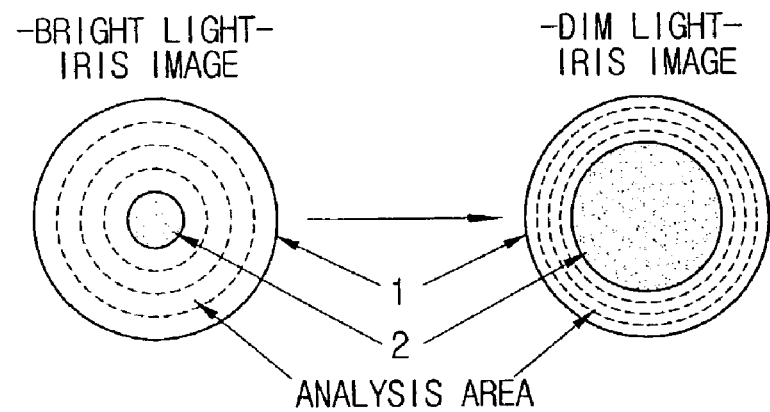
FIG. 1A and FIG. 1B are drawings for illustrating the identification-failing risk in a prior art iris identification system.
Figure 1B:
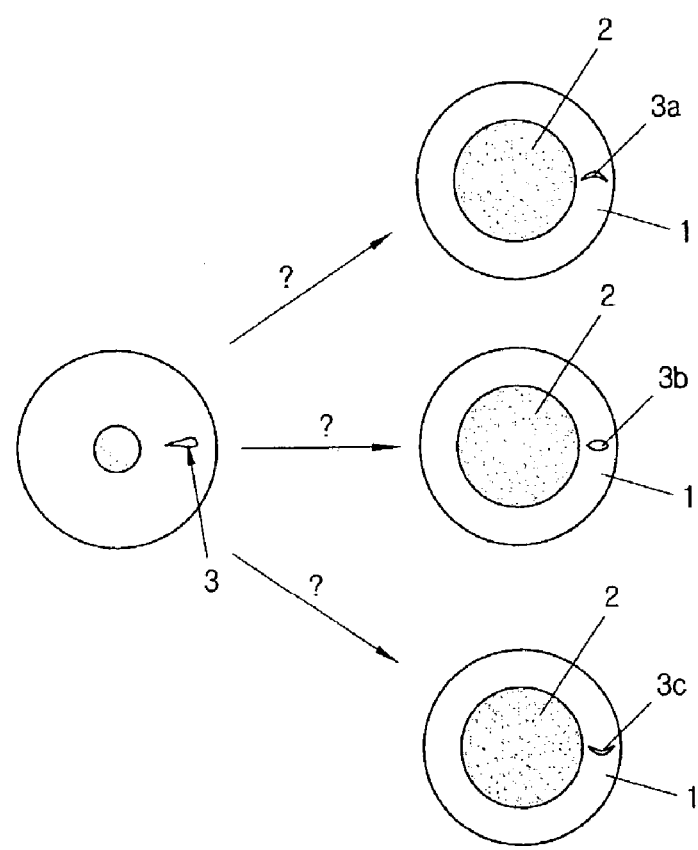
Figure 2:
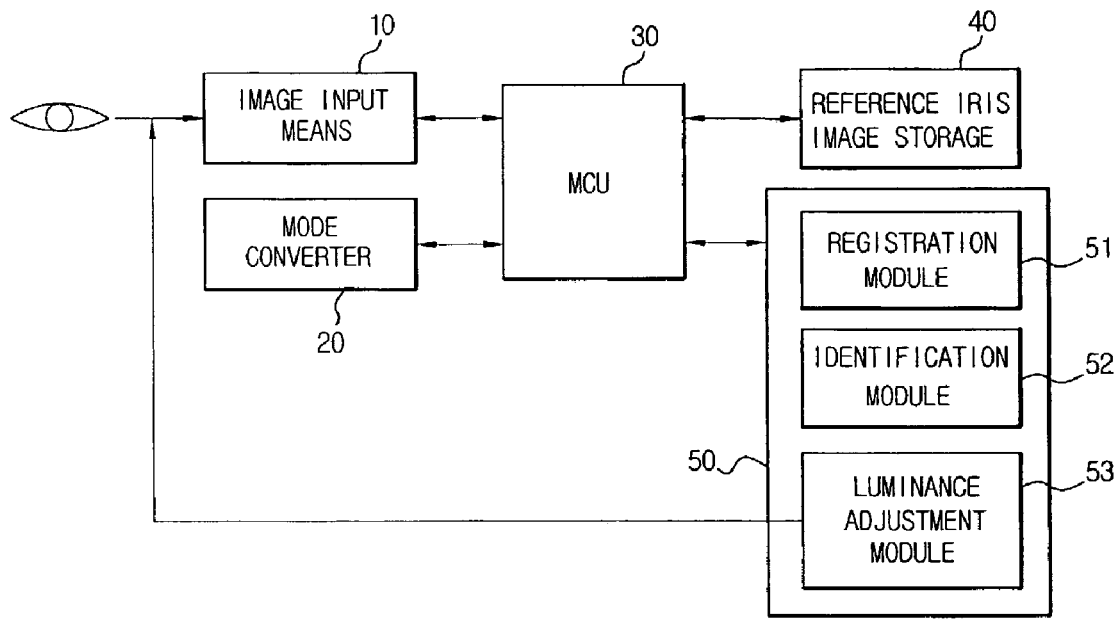
FIG. 2 is a block diagram illustrating an iris identification system according to a preferred embodiment of the present invention.

FIG. 2 shows an iris identification system according to a preferred embodiment of the present invention.

As shown in FIG. 2, the iris identification system comprises an image input means 10, a mode converter 20, a main control unit (MCU) 30, a reference iris image storage 40, and an image control unit 50.

The image input means 10 comprises a camera for capturing an iris image and an image-processing module (not shown).

The mode converter 20 comprises a keyboard (not shown) on which a user selects one of a registration mode and an identification mode. The registration mode is for registering an input iris image as a reference iris image and the identification mode is for identifying the input iris image by comparing with the previously registered reference iris images.

The reference iris image storage 40 stores the registered iris images under control of the MCU 30.

The image control unit 50 comprises a registration module 51 for capturing a plurality of iris images inputted by the image input means 10 under various luminance environments when the registration mode is selected by the mode converter 20 and registering the captured iris images as reference iris images, an identification module 52 for comparing an iris image inputted by the image input means 10 when the identification mode is selected by the module converter 20 with the reference iris images registered by the registration module 51 and analyzing the similarities between the iris image and the reference iris images so as to verify identification, and a luminance adjustment module 53 for sequentially selecting the predetermined luminance levels when the registration mode is selected by the mode converter 20 and irradiating the light of the selected luminance level together with infrared ray to the eye for iris registration. Therefore the image input means 10 inputs iris image whenever the light selected by the luminance adjustment module 53 is irradiated to the eye, and the registration module 51 may capture iris images from the image input means 10.

The MCU 30 controls the registration module 51 of the image control unit 50 to capture iris images from the image input means 10, to register the iris images as the reference iris, and to store the registered reference iris images in the reference iris image storage 40 when the registration mode is selected by the mode converter 20. The MCU 30 also controls the identification module 52 of the image control unit 50 to compare the iris image inputted from the image input means 10 with the reference iris images and to analyze similarities between the inputted iris image and the reference iris images so as to verify identification when the identification mode is selected by the mode converter 20. Also, the MCU 30 controls the luminance adjustment module 53 of the image control unit 50 to select one of the luminance levels corresponding to the predetermined various illumination environments and to irradiate the light of the selected luminance level together with infrared ray to the eye for iris registration.

The MCU 30 can be structured so as to integrate the reference iris image storage 40 and the image control unit 50.

Figure 3:
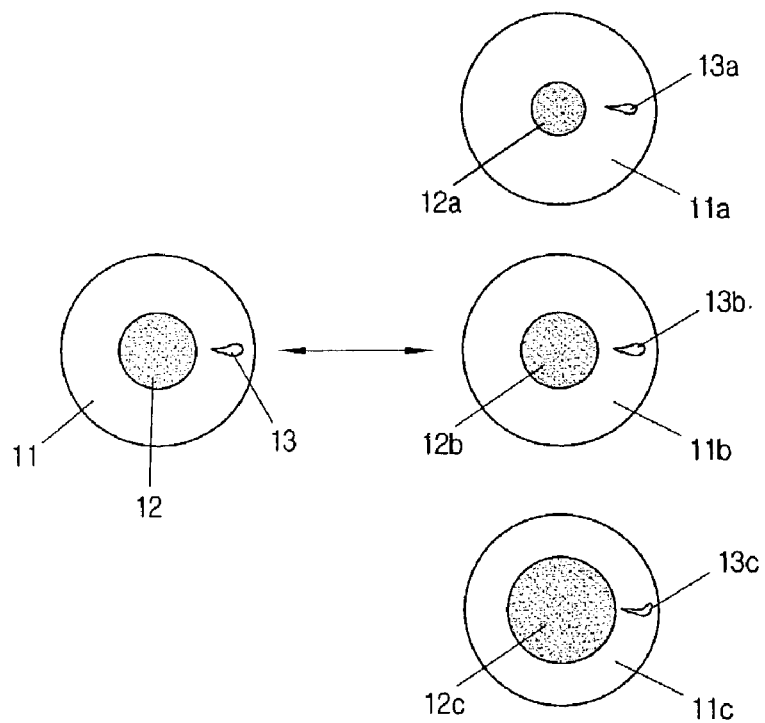
FIG. 3 is a drawing for illustrating a process of comparing the input iris image with the reference iris images in the iris identification system of FIG. 2.
Figure 4A:
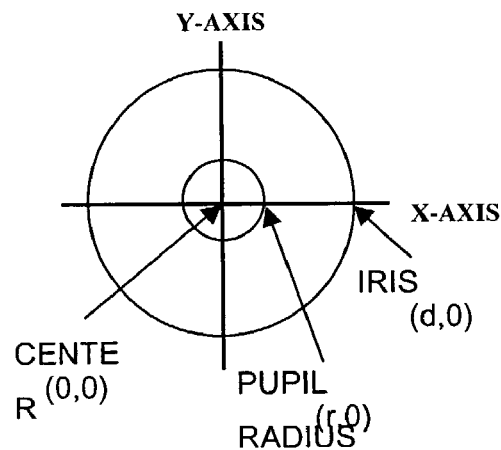
FIG. 4A and FIG. 4B are a set of drawings for illustrating the size of a pupil varying according to the light amount irradiated to an eye.
Figure 4B:
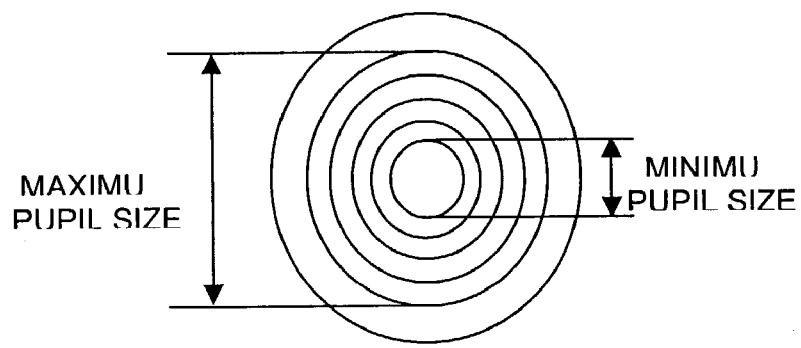

FIG. 3 is a drawing for illustrating a process of comparing an input iris image with the reference iris images stored in the reference iris image storage 40 and FIG. 4A and FIG. 4B are a set of drawings for illustrating the size of a pupil varying according to the light amount irradiated to an eye.

Referring to FIG. 3, reference numbers 11, 11a, 11b and 11c represent iris, reference numbers 12, 12a, 12b and 12c represent pupil in the iris, and reference numbers 13, 13a, 13b and 13c represent characteristic factor for each eye. FIG. 3 shows that the iris image for identification is compared with the reference iris images stored in the reference iris image storage 40.

Referring to FIG. 4A and FIG. 4B, the iris images are differentiated according to a size of pupil dilating in the iris where r is a pupil radius and d is an iris radius (d>r). The iris images may be classified into several classes by the pupil radius "r" because the pupil radius "r is changeable but the iris radius "d" is unchangeable in the same eye. A whole class range "β" for classification of the iris images can be expressed as follows.

$$\frac{1}{5} \le \left( \beta = \frac{|d|-|r|}{|d|} \right) \le \frac{4}{5}$$

$$\left[ x = \frac{\beta}{n} \right]$$

$$x = \frac{\beta_{max} - \beta_{min}}{n}$$

wherein, n is number of classes to be classified, and x is range of each class.

Figure 5:
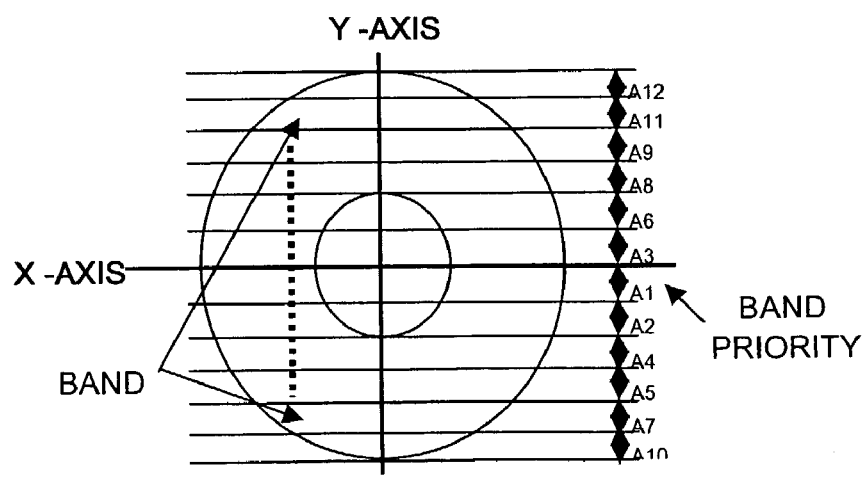
FIG. 5 is a diagrammatic view for illustrating the bands of an iris image and its priority.
Figure 6:
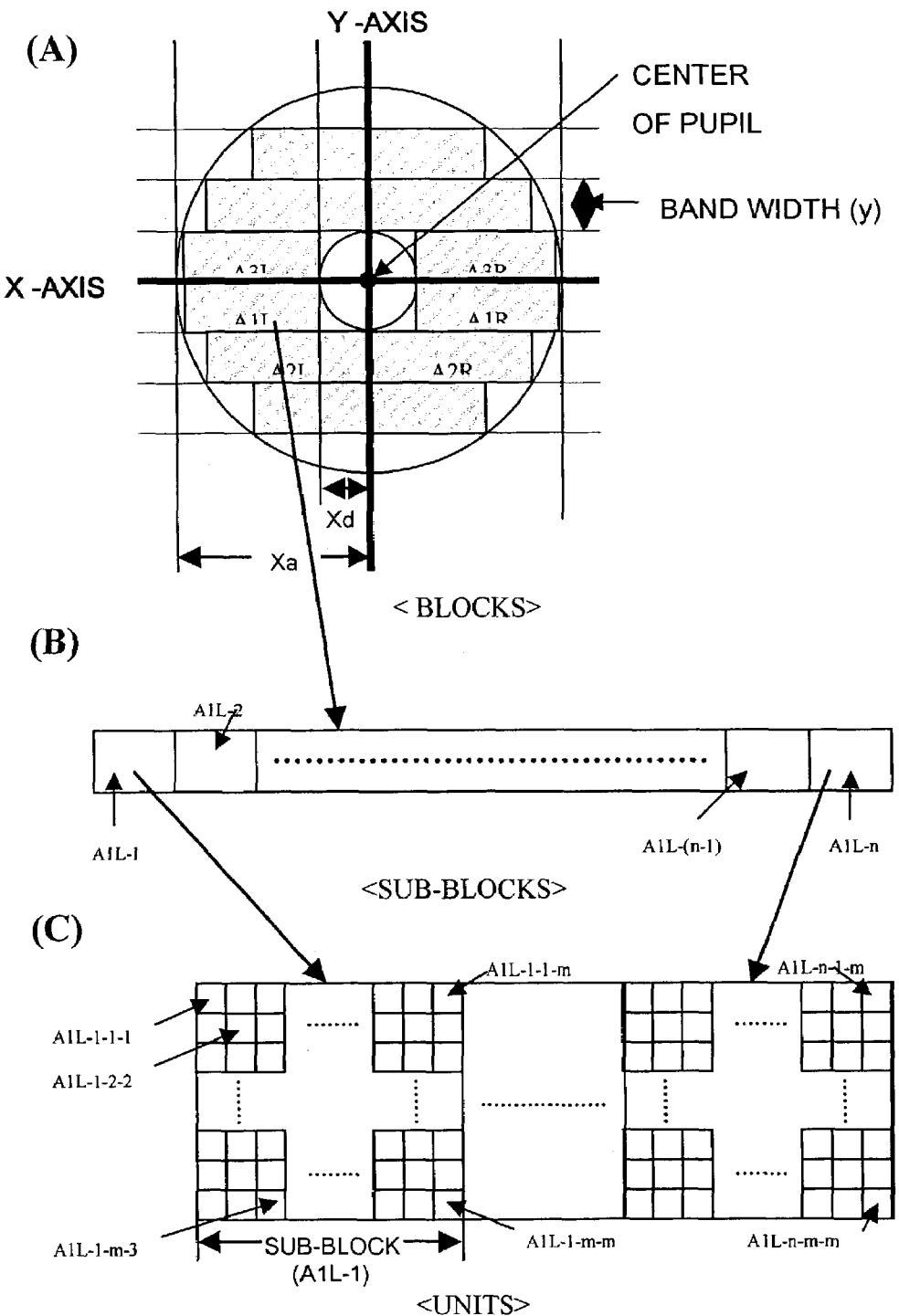
FIGS. 6(A), 6(B), and 6(C) are diagrammatic views for illustrating how to create blocks, sub-blocks and units in each band of FIG. 5.

FIG. 5 is a diagrammatic view for illustrating the bands of an iris image and its priority, and FIG. 6 is a diagrammatic view for illustrating how to create blocks, sub-blocks and units in each band of FIG. 5.

As shown in FIG. 5, the iris image is horizontally partitioned up and down on the basis of a horizontal axis x at a predetermined interval to form a plurality of bands and each band has its own priority for example, A1>A2>A3, ..., A10>A11>A12. The priority signifies an order to be considered when an iris image is analyzed for identification. Each band has its own weighted value corresponding to the priority.

Referring to FIG. 6, the bands are vertically divided by a perpendicular line (y axis) passing the center of the pupil so that each band forms a pair of symmetrical blocks (FIG. 6(A)). Each block is divided into a plurality of sub-blocks (FIG. 6(B)), and each sub-block is also divided into a plurality of units (FIG. 6(C)). Each block is defined by the vertical width of the band, the iris boundary and pupil boundary. And also each block has a weighted value such that the priority of the block is defined by the band width and the horizontal length from the iris radius $X_a$ to the pupil radius $X_d$. A maximum horizontal length of a block can be expressed as following inequality.

$$|X_d| < |\max X| < |X_a| (\text{only}, |X_a| > |X_d|)$$

Thus, a maximum dimension "maxT" of the block can be calculated as following equation $$\max T = (|X_a| - |X_d|) y$$

wherein, y is a vertical width of each band and may be obtained from the following equation $$y = \frac{2X_a}{n},$$

herein, n is total number of the band.

The registration module 51 determines a pupil boundary by calculating an average luminance of the iris image after getting the luminance of the pixels in the iris image. The average luminance is calculated by following equation 1.

When $I_{min} < I_b < I_{ma}$, < Equation 1 >

$$I_{mb} = \frac{1}{N_b} \sum I_b$$

wherein, $$I_{ma} = \frac{1}{N_a} \sum I_a, I_a$$

is luminance of a pixel in the iris image, $I_{ma}$ is an average luminance of the iris image, $N_a$ is number of pixels in the iris image, and $I_{min}$ is a minimum luminance limit. FIG. 7(A) shows a pupil contour calculated by equation 1.

FIG. 7(A) to FIG. 7(D) are drawings for illustrating how the pupil center of the iris image is obtained by the registration module 51.

Referring to FIG. 7, once an iris image is taken, two points of $S(x_1, y_1)$ and $E(x_2, y_2)$ are randomly selected on the pupil boundary of the iris image so as to create a segment SE by drawing a line connecting the points S and E. Then, a imaginary perpendicular line is drawn from a center of the segment SE such that the perpendicular line crosses the pupil boundary at a point C ($X_3$, $y_3$). The center $I_i(x_0, y_0)$ of the pupil for the selected pupil boundary SE is calculated by the following equation 2a.

$$a = \frac{1}{2}\sqrt{(x_1 - x_2)^2 + (y_1 - y_2)^2}$$
$$c = \frac{1}{2}\sqrt{(x_1 + x_2 - 2x_3)^2 + (y_1 + y_2 - 2y_3)^2}$$
$$d = \frac{1}{2c}(a^2 - c^2),$$
$$D = \tan^{-1}\left(\frac{y_1 - y_2}{x_1 - x_2}\right) - \frac{\pi}{2}$$
$$x_0 = d \cdot \cos D + \frac{1}{2}(x_1 + x_2)$$
$$y_0 = -\left(d \cdot \sin D + \frac{1}{2}(y_1 + y_2)\right)$$

<Equation 2a> wherein, "a" is a half of the length of segment SE, and "c" is a distance from the center of the segment SE to point C.

The registration module 51 calculates a plurality of candidate centers $I_i$ of the pupil using the equation 2a and extracts the candidate centers ($x_{0i}$, $y_{0i}$) of which radii are in the whole class range β. These candidate centers are used in order to obtain a final pupil center $T_p(x_p, y_p)$. The final pupil center $T_p$ is calculated as following equation 2b.

$$x_p = \frac{1}{n}\sum x_{oi}, y_p = \frac{1}{n}\sum y_{oi}$$

<Equation 2b> wherein, "n" means the number of the candidate centers, and ($x_{0i}$, $y_{0i}$) means x-axis and y-axis coordinates of each candidate center FIG. 8(A) to FIG. 8(D) are drawings for illustrating the luminance distribution of a sub-block in iris image and how the luminance is compensated. In FIG. 8, x-axis represents units in a sub-block and y-axis represents the value of the luminance.

The iris image is stored into the storage medium 40 after each unit in the sub-block is classified into a main data (FIG. 8(B)), an auxiliary data (FIG. 8(A)), a negative main data (FIG. 8(C)) and a compensation data (FIG. 8(D)) according to the luminance of the unit.

As shown in FIG. 8(A), the units in the sub-block of which luminance are less than the average luminance of the sub-block are defined as an auxiliary data. And among the units defined as the auxiliary data, the units in the sub-block that have a luminance less than average luminance of the auxiliary data indicated as horizontal dot line in FIG. 8(B) and the length larger than the predetermined length are defined as main data as shown in FIG. 8(B). Herein, "length" signifies number of continuous units. As shown in FIG. 8(C), the units in the sub-block of which luminance is greater than the average luminance of the sub-block, and has the length larger than the predetermined length are defined as a negative main data.

The auxiliary data is divided into two portions on the base of the average luminance of the auxiliary data. The compensation data may be defined in the scope of 9/10~11/10 of the average luminance of the auxiliary data as shown in FIG. 9(D).

The compensation level is 1 when the auxiliary data satisfies the condition of $$\frac{9}{10}h \leq \rho_m \leq \frac{11}{10}h \text{ or } 0.$$

Wherein, $\rho_m$ is the average luminance value of an unit and h is the average luminance of the auxiliary data.

The process for registering a reference iris image according to a preferred embodiment of the present invention will be described with reference to FIG. 9 and FIG. 10A, FIG. 10B, FIG. 10C, and FIG. 10D hereinafter.

Figure 9:
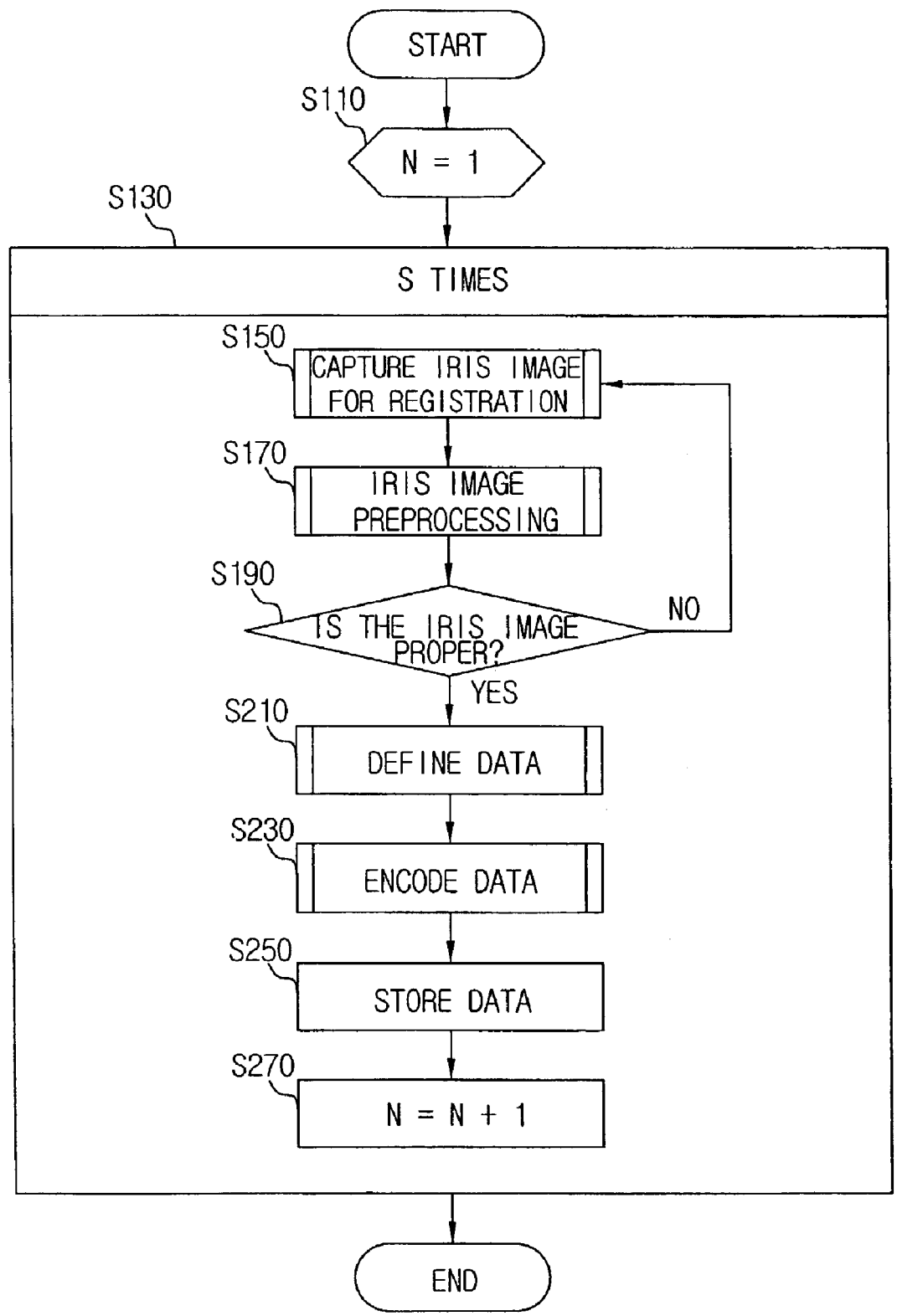
FIG. 9 is a flowchart for illustrating a reference iris image-registering process according to an iris identification method of the present invention.

FIG. 9 is a flowchart for illustrating a reference iris image-registering process according to an iris identification method of the present invention.

Figure 8:
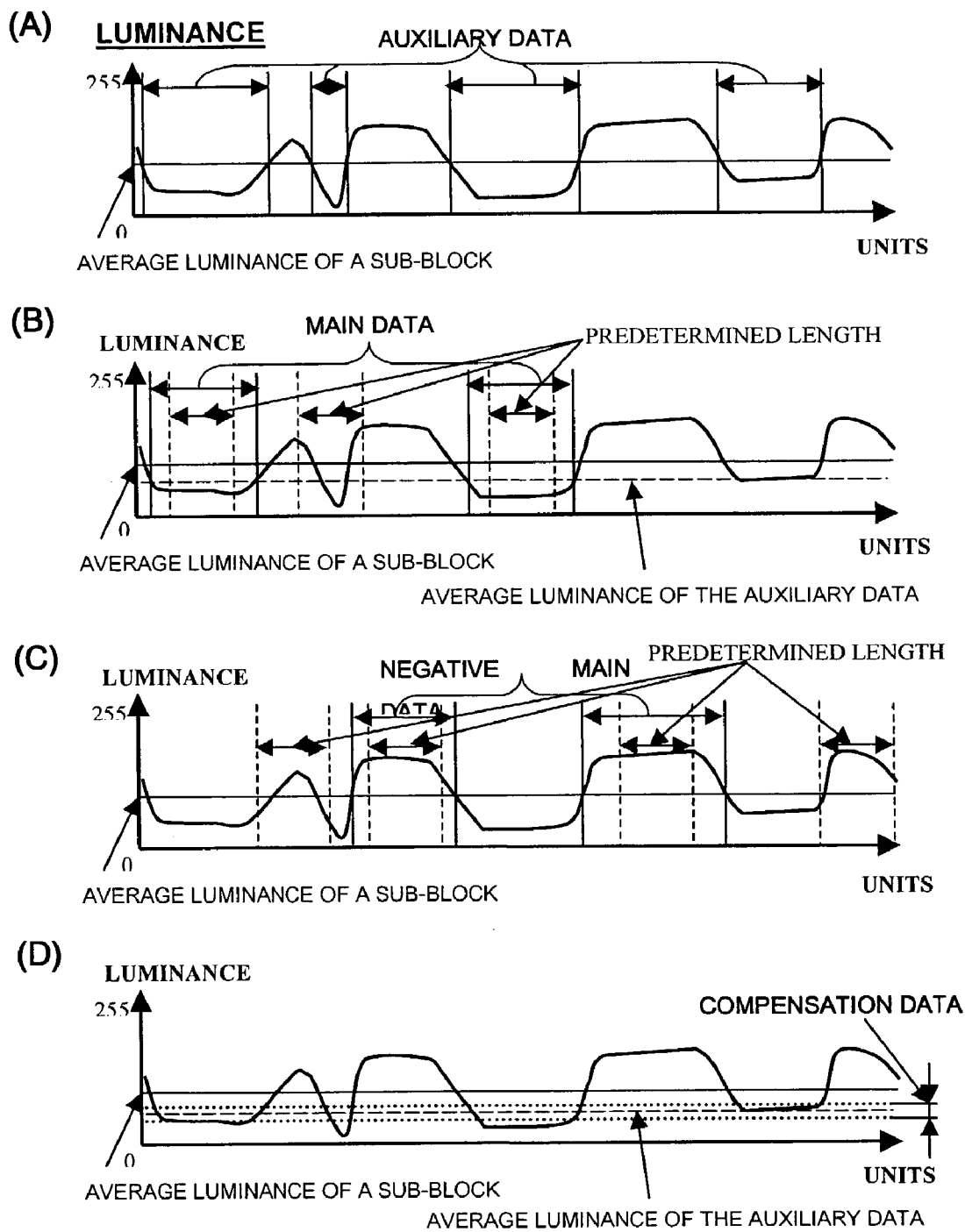
FIG. 8(A) is a graph for illustrating the auxiliary data on the basis of the average luminance of a sub-block.
FIG. 8(B) is a graph for illustrating the main data on the basis of the average luminance of a sub-block.
FIG. 8(C) is a graph for illustrating the negative main data on the basis of the average luminance of a sub-block.
FIG. 8(D) is a graph for illustrating the auxiliary compensation data on the basis of the average luminance of a sub-block.

As shown in FIG. 9, when an iris image is inputted by the image input means 10 under the predetermined first luminance environment (N=1) at the step S110, the iris image is captured by the registration module 51 at the step S150, and the preprocessing for the iris image is implemented at step S170 to decide the pupil boundary, the pupil center and the size of iris. At the step S190, it is decided whether the preprocessed iris image is proper to be registered as a reference iris image or not. If not, the process returns to the step S150 and if yes, the process goes to step S210. At step S210, the input iris image is divided into bands, blocks, sub-blocks and units as shown in FIG. 6. The data type for the divided iris image is defined as shown in FIG. 8 at the step S 210 and is encoded at the step S230. The encoded data produced at step S230 are stored into the reference iris image storage 40 for comparison at the step S250. As indicated at the step S270, the luminance will be switched to the next grade (N=N+1) and the process of steps S150~S250 will be repeated until S iris images are captured under the predetermined luminance levels for example $Q_1, Q_2 \ldots Q_N \ldots Q_S$.

Figure 10A:
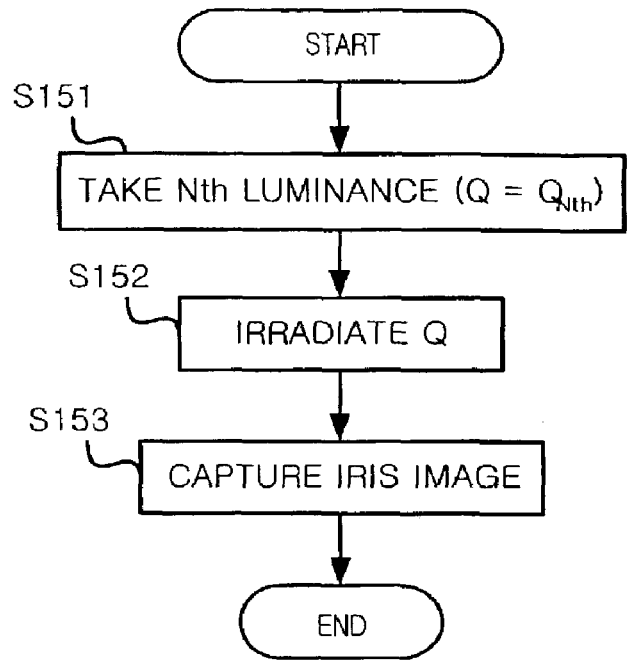
FIG. 10A is a flowchart for illustrating an image-capturing step of the reference iris image-registering process of FIG. 9.

FIG. 10A is a flowchart for illustrating an iris image-capturing step of the reference iris image-registering process of FIG. 9.

Referring to the FIG. 10A, this is to explain the details of the iris image capturing process. The steps S151, S152 and S153 show the flow how to set the "N"th luminance level out of the S predetermined luminance levels. When Nth luminance level (Q=$Q_{Nth}$) is taken from the predetermined luminance levels at the step S151, the light corresponding to the luminance level is irradiated to the eye for registration at the step S152, and then the iris image will be obtained at the step S153.

Figure 10B:
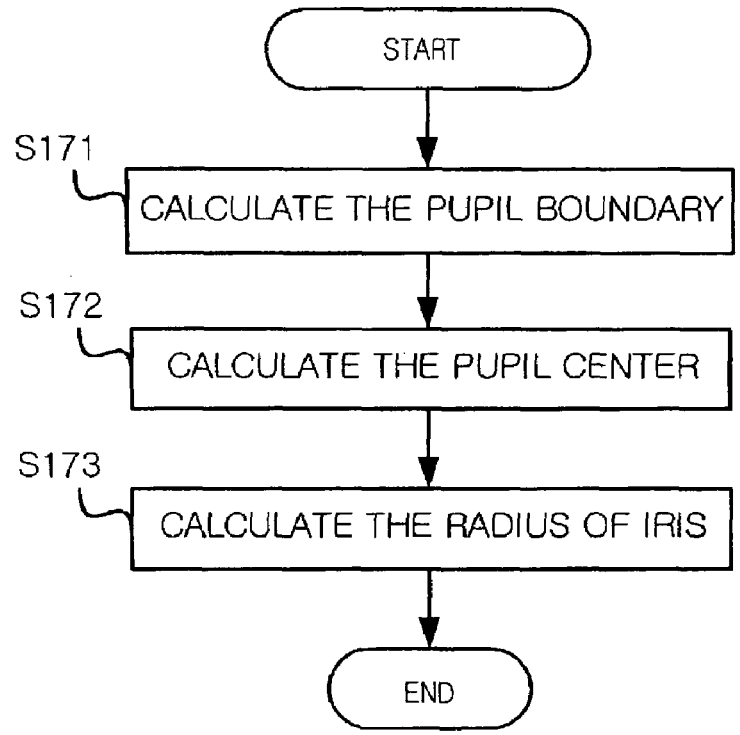
FIG. 10B is a flowchart for illustrating an image preprocessing step of FIG. 9.

FIG. 10B is a flowchart for illustrating an iris image preprocessing at step S170 of FIG. 9.

Referring to FIG. 10B, this is to explain the process how to produce the pupil boundary, the pupil center and the size of the iris. The image preprocessing for the obtained iris image may be done as shown in FIG. 10B. Firstly, the pupil boundary of the iris image is calculated as described in the former description (Equation 1) at the step S171. The pupil center is calculated as explained in the former description (Equation 2a & 2b) at the step S172. Finally, with the distance between the pupil center and the iris boundary, the radius of the iris is calculated at the step S173.

Figure 10C:
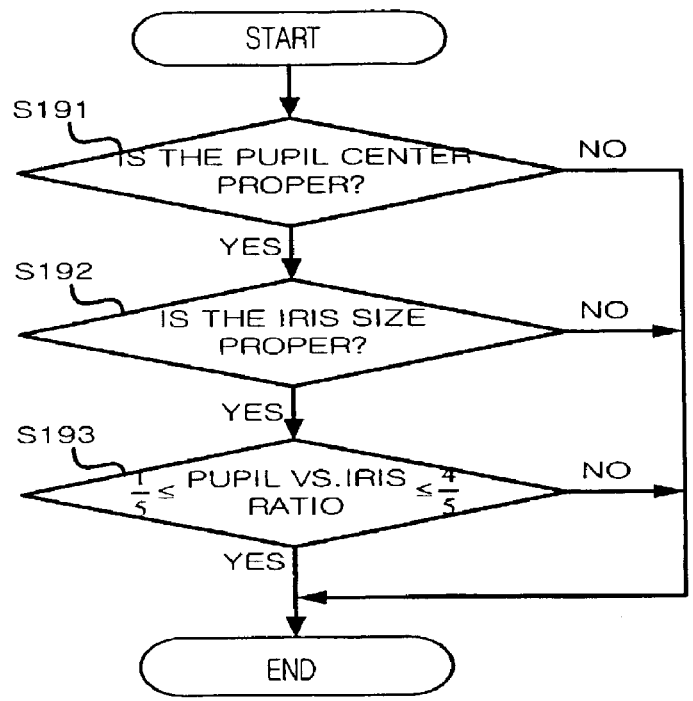
FIG. 10C is a flowchart for illustrating the step S190 of FIG. 9.

FIG. 10C is a flowchart for illustrating the step S190 of FIG. 9.

Referring to the FIG. 10C, this is the flowchart how to measure the input iris image and decide whether the input iris image is proper to be a reference iris image or not. At the step S191, the registration module 51 determines whether the pupil center is in the predetermined range or not. And the step S192, the registration module 51 determines whether the size of the iris is in the predetermined range or not. Finally at the step S193, the registration module 51 calculates the ratio of the pupil radius to the iris radius and determines whether the ratio is in the predetermined range or not.

Figure 10D:
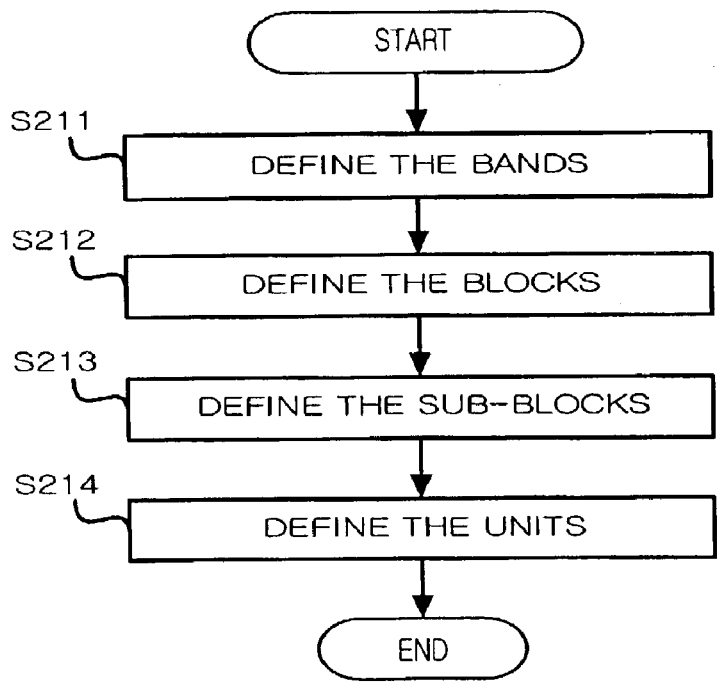
FIG. 10D is a flowchart for illustrating the step S210 of FIG. 9.

FIG. 10D is a flowchart for illustrating the step S210 of FIG. 9.

Referring to the FIG. 10D, this is the flowchart to explain the order of the analysis process and how to create the unit out of the proper iris image. As explained in the former description, a plurality of the bands are created by dividing the iris horizontally at the step S211, and a plurality of blocks are defined from the band at the step S212, and also the sub-blocks are derived from the block at the step S213, and finally the units are derived from the sub-block at the step S214.

Figure 11:
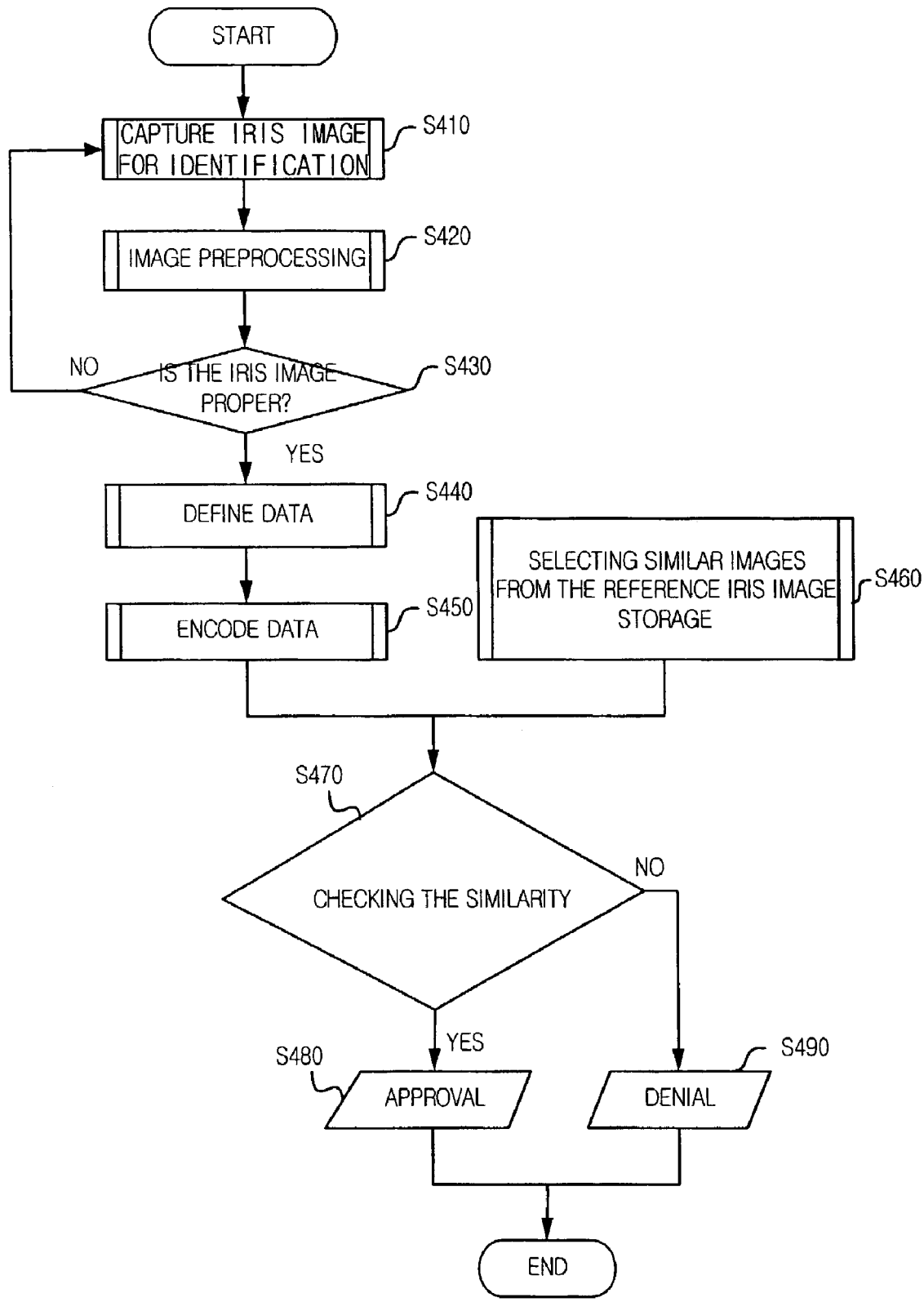
FIG. 11 is a flowchart for illustrating the identification process according to the iris identification method of the present invention.

FIG. 11 is a flowchart for illustrating the identification process according to the iris identification method of the present invention.

Referring to FIG. 11, this is a flowchart to explain the iris identification process according to the present invention. The steps from S410 to S450 are same to the steps S150~S230 in the FIG. 9. However in FIG. 11, one input iris image is enough to implement the identification method of the present invention. The iris image (encoded data) obtained through the steps S410~S450 is compared with the iris images (encoded data) in the reference iris image storage 40. And at the step S460, the iris images similar to the inputted iris image for identification are selected from the reference iris image storage 40. At the step S470, the similarity between the inputted iris image and the selected images is checked to output approval message or denial message for the identification at steps S480 and S490.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The present disclosure relates to subject matter contained in priority Korean Patent Application No. 2000-59099, filed on Oct. 7, 2000, the contents of which is herein expressly incorporated by reference in its entirety.

What is claimed is:

1. An iris identification system for confirming an identity of a person, comprising:

a mode converter that selects one of registration and identification modes;

an image inputter that inputs an iris image;

a luminance adjustment module that sequentially selects predetermined luminance levels when the registration mode is selected, and irradiates light of the selected luminance level together with an infrared ray for iris registration;

a registration module that captures a plurality of reference iris images input when the light of the selected luminance level is irradiated, preprocesses each captured reference iris image to determine pupil boundary, pupil center, iris size, and class, categorizes each preprocessed reference iris image as at least one of main, auxiliary, negative main and compensation data, encodes the categorized data of each reference iris image, and registers the encoded data of the plurality of reference iris images as registered reference iris images;

an identification module that captures an iris image for identification input when the identification mode is selected, preprocesses the captured iris image for identification to determine pupil boundary, pupil center, iris size, and class, categorizes the preprocessed iris image for identification as at least one of main, auxiliary, negative main and compensation data, encodes the categorized data of the iris image for identification, and analyzes similarity between the encoded data of the iris image for identification and the registered reference iris images;

a reference iris image storage that stores the data of the registered reference iris images; and a main control unit that controls the image inputter, the luminance adjustment module, the registration module, the identification module and the reference iris image storage according to the mode of the mode converter;

wherein each iris image captured by the registration module and the identification module is horizontally divided so as to form a plurality of horizontal bands, the horizontal bands are divided by a perpendicular passing through a center of the pupil such that a plurality of blocks are symmetrically formed, each block is divided into a plurality of rectangular sub-blocks and each rectangular sub-block is divided into a plurality of units;

wherein each band has a priority and a weighted value to be considered in the analysis; and wherein each unit in a rectangular sub-block is classified as at least one of auxiliary data, main data, negative main data, and compensation data according to the luminance level of the unit.

2. The iris identification system of claim 1, wherein units having luminance less than the average luminance of the rectangular sub-block are categorized as auxiliary data;

wherein, among units categorized as auxiliary data, units having luminance less than average luminance of auxiliary data and length larger than a predetermined length are categorized as main data, units having luminance greater than the average luminance of the rectangular sub-block and length larger than the predetermined length are categorized as negative main data; and wherein units corresponding to 9/10~41/10 of the average luminance of auxiliary data are categorized as compensation data.

3. The iris identification system of claim 1, wherein a center of the pupil is calculated by obtaining a plurality of random pupil centers $I_i$, extracting candidate pupil centers from the random pupil centers, and calculating a final pupil center $T_p(x_p, y_p)$ using the candidate pupil centers.

4. The iris identification system of claim 3, wherein the random pupil center $I_i$ is obtained by randomly selecting two points, $S(x_1, y_1)$ and $E(x_2, y_2)$, on the pupil boundary of the iris image, defining a segment SE by a line connecting the points S and E, defining a perpendicular to the segment SE extending from a center of the segment SE such that the perpendicular crosses the pupil boundary at a point $C(x_3, y_3)$, and calculating the random pupil center $I_i(x_0, y_0)$ by the following relationships:

$$a = \frac{1}{2}\sqrt{(x_1 - x_2)^2 + (y_1 - y_2)^2},$$

$$c = \frac{1}{2}\sqrt{(x_1 - x_2 - 2x_3)^2 + (y_1 - y_2 - 2y_3)^2}$$

$$d = \frac{1}{2c}(a^2 - c^2),$$

$$D = \tan^{-1}\left(\frac{y_1 - y_2}{x_1 - x_2}\right) - \frac{\pi}{2},$$

$$x_0 = d \cdot \cos D + \frac{1}{2}(x_1 + x_2)$$

$$y_0 = -\left(d \cdot \sin D + \frac{1}{2}(y_1 + y_2)\right)$$

wherein, a is half of the length of segment SE, c is a distance from the center of the segment SE to point C, and d is a distance from the center of the segment SE to the random pupil center $I_i(x_0, y_0)$, wherein the candidate pupil centers have radii that are in whole class range B, wherein, B is the ratio of the pupil radius to the iris radius and satisfies $$\frac{1}{5} \leq \beta \leq \frac{4}{5};$$

and wherein the final pupil center $T_p(x_p, y_p)$ is obtained by the following equations:

$$x_p = \frac{1}{n}\sum x_{0i},$$

$$y_p = \frac{1}{n}\sum y_{0i}$$

wherein, n is number of the candidate centers, and $x_{0i}$, $y_{0i}$ are respectively x-axis and y-axis coordinates of a center of each candidate.

5. The iris identification system of claim 1, wherein the pupil boundary is determined by the following equation:

when $I_{min} < I_b < I_{ma}$, $$I_{mb} = \frac{1}{N_b}\sum I_b$$

wherein, $$I_{ma} = \frac{1}{N_a}\sum I_a,$$

$I_a$ is luminance of a pixel in the iris image, $I_{ma}$ is an average luminance of the iris image, $N_a$ is number of pixels in the iris image, and $I_{min}$ is a minimum luminance limit.

6. An iris identification method for confirming an identity of a person, comprising:

selecting one of registration and identification modes;
inputting an iris image;
sequentially selecting predetermined luminance levels when the registration mode is selected, and irradiating light of the selected luminance level together with an infrared ray for iris registration;
capturing a plurality of reference iris images input when the light of the selected luminance level is irradiated, preprocessing each captured reference iris image to determine pupil boundary, pupil center, iris size, and class, categorizing each preprocessed reference iris image as at least one of main, auxiliary, negative main and compensation data, encoding the categorized data of each reference iris image, and registering the encoded data of the plurality of reference iris images as registered reference iris images;
storing the data of the registered reference iris images; and
capturing an iris image for identification input when the identification mode is selected, preprocessing the captured iris image for identification to determine pupil boundary, pupil center, iris size, and class, categorizing the preprocessed iris image for identification as at least one of main, auxiliary, negative main and compensation data, encoding the categorized data of the iris image for identification, and analyzing similarity between the encoded data of the iris image for identification and the registered reference iris images;
wherein each captured iris image is horizontally divided so as to form a plurality of horizontal bands, the horizontal bands are divided by a perpendicular passing through a center of the pupil such that a plurality of blocks are symmetrically formed, each block is divided into a plurality of rectangular sub-blocks and each rectangular sub-block is divided into a plurality of units;
wherein each band has a priority and a weighted value to be considered in the analysis; and
wherein each unit in a rectangular sub-block is classified as at least one of auxiliary data, main data, negative main data, and compensation data according to the luminance level of the unit.

7. The iris identification method of claim 6,
wherein units having luminance less than the average luminance of the rectangular sub-block are categorized as auxiliary data;
wherein, among units categorized as auxiliary data, units having luminance less than average luminance of auxiliary data and length larger than a predetermined length are categorized as main data, units having luminance greater than the average luminance of the rectangular sub-block and length larger than the predetermined length are categorized as negative main data; and
wherein units corresponding to 9/10~11/10 of the average luminance of auxiliary data are categorized as compensation data.

8. The iris identification method of claim 6,
wherein a center of the pupil is calculated by obtaining a plurality of random pupil centers $I_i$, extracting candidate pupil centers from the random pupil centers, and calculating a final pupil center $T_p(x_p, y_p)$ using the candidate pupil centers.

9. The iris identification method of claim 8
wherein the random pupil center $I_i$ is obtained by random selecting two points, $S(x_1, y_1)$ and $E(x_2, y_2)$, on the pupil boundary of the iris image, defining a segment SE by a line connecting the points S and E, defining a perpendicular to the segment SE extending from a center of the segment SE such that the perpendicular crosses the pupil boundary at a point C($x_3$, $y_3$), and calculating the random pupil center $I_i(x_0, y_0)$ by the following relationships:

$$a = \frac{1}{2}\sqrt{(x_1 - x_2)^2 + (y_1 - y_2)^2},$$

$$c = \frac{1}{2}\sqrt{(x_1 - x_2 - 2x_3)^2 + (y_1 - y_2 - 2y_3)^2}$$

$$d = \frac{1}{2c}(a^2 - c^2)$$

$$D = \tan^{-1}\left(\frac{y_1 - y_2}{x_1 - x_2}\right) - \frac{\pi}{2},$$

$$x_0 = d \cdot \cos D + \frac{1}{2}(x_1 + x_2)$$

$$y_0 = -\left(d \cdot \sin D + \frac{1}{2}(y_1 + y_2)\right)$$

wherein, a is half of the length of segment SE, c is a distance from the center of the segment SE to point C, and d is a distance from the center of the segment SE to the random pupil center $I_i(x_0, y_0)$, wherein the candidate pupil centers have radii that are in whole class range β, wherein, β is the ratio of the pupil radius to the iris radius and satisfies $$\frac{1}{5} \le \beta \le \frac{4}{5};$$

and wherein the final pupil center $T_p(x_p, y_p)$ is obtained by the following equation:

$$x_p = \frac{1}{n}\sum x_{0i},$$

$$y_p = \frac{1}{n}\sum y_{0i}$$

wherein, n is number of the candidate centers, and $x_{0i}$, $y_{0i}$ are respectively x-axis and y-axis coordinates of a center of each candidate.

10. The iris identification method of claim 6, wherein the pupil boundary is determined by the following equation:

when $I_{min} < I_b < I_{ma}$, $$I_{mb} = \frac{1}{N_b}\sum I_b$$

wherein, $$I_{ma} = \frac{1}{N_a}\sum I_a,$$

$I_a$ is luminance of a pixel in the iris image, $I_{ma}$ is an average luminance of the iris image, $N_a$ is number of pixels in the iris image, and $I_{min}$ is a minimum luminance limit.

11. A computer readable medium for storing a program that implements iris identification to confirm an identity of a person, comprising:

a mode selecting segment that selects one of registration and identification modes;

an inputting segment that inputs an iris image;

a luminance level segment that sequentially selects predetermined luminance levels when the registration mode is selected, and irradiates light of the selected luminance level together with an infrared ray for iris registration;

an image capturing segment that captures a plurality of reference iris images input when the light of the selected luminance level is irradiated, preprocesses each captured reference iris image to determine pupil boundary, pupil center, iris size, and class, categorizes each preprocessed reference iris image as at least one of main, auxiliary, negative main and compensation data, encodes the categorized data of each reference iris image, and registers the encoded data of the plurality of reference images as registered reference iris images;

a data storing segment that stores the data of the registered reference iris images; and an image capturing segment that captures an iris image for identification input when the identification mode is selected, preprocesses the captured iris image for identification to determine pupil boundary, pupil center, iris size, and class, categorizes the preprocessed iris image for identification as at least one of main, auxiliary, negative main and compensation data, encodes the categorized data of the iris image for identification, and analyzes similarity between the encoded data of the iris image for identification and the registered reference iris images;

wherein each captured iris image is horizontally divided so as to form a plurality of horizontal bands, the horizontal bands are divided by a perpendicular passing through a center of the pupil such that a plurality of blocks are symmetrically formed, each block is divided into a plurality of rectangular sub-blocks and each rectangular sub-block is divided into a plurality of units;

wherein each band has a priority and a weighted value to be considered in the analysis; and wherein each unit in a rectangular sub-block is classified as at least one of auxiliary data, main data, negative main data, and compensation data according to the luminance level of the unit.

12. The computer readable storage medium of claim 11, wherein units having luminance less than the average luminance of the rectangular sub-block are categorized as auxiliary data;

wherein, among units categorized as auxiliary data, units having luminance less than average luminance of auxiliary data and length larger than a predetermined length are categorized as main data, units having luminance greater than the average luminance of the rectangular sub-block and length larger than the predetermined length are categorized as negative main data; and wherein units corresponding to 9/10~11/10 of the average luminance of auxiliary data are categorized as compensation data.

13. The computer readable storage medium of claim 11, wherein a center of the pupil is calculated by obtaining a plurality of random pupil centers $I_i$, extracting candidate pupil centers from the random pupil centers, and calculating a final pupil center $T_p(x_p, y_p)$ using the candidate pupil centers.

14. The computer readable storage medium of claim 13, wherein the random pupil center $I_i$, is obtained by randomly selecting two points, $S(x_1, y_1)$ and $E(x_2, y_2)$, on the pupil boundary of the iris image, defining a segment SE by a line connecting the points S and E, defining a perpendicular to the segment SE extending from a center of the segment SE such that the perpendicular crosses the pupil boundary at a point $C(x_3, y_3)$, and calculating the random pupil center $I_t(x_0, y_0)$ by the following relationships:

$$a = \frac{1}{2}\sqrt{(x_1-x_2)^2 + (y_1-y_2)^2},$$

$$c = \frac{1}{2}\sqrt{(x_1-x_2-2x_3)^2 + (y_1-y_2-2y_3)^2}$$

$$d = \frac{1}{2c}(a^2 - c^2)$$

$$D = \tan^{-1}\left(\frac{y_1-y_2}{x_1-x_2}\right) - \frac{\pi}{2},$$

$$x_0 = d \cdot \cos D + \frac{1}{2}(x_1 + x_2)$$

$$y_0 = -\left(d \cdot \sin D + \frac{1}{2}(y_1 + y_2)\right)$$

wherein, a is half of the length of segment SE, c is a distance from the center of the segment SE to point C, and d is a distance from the center of the segment SE to the random pupil center $I_t(x_0, y_0)$, wherein the candidate pupil centers have radii that are in whole class range $\beta$, wherein, $\beta$ is the ratio of the pupil radius to the iris radius and satisfies $$\frac{1}{5} \leq \beta \leq \frac{4}{5};$$

wherein the final pupil center $T_p(x_p, y_p)$ is obtained by the following equation:

$$x_p = \frac{1}{n}\sum x_{0i},$$

$$y_p = \frac{1}{n}\sum y_{0i}$$

wherein, n is number of the candidate centers, and $x_{0i}$, $y_{0i}$ are respectively x-axis and y-axis coordinates of a center of each candidate.

15. The computer readable storage medium of claim 11, wherein the pupil boundary is determined by the following equation:

when $I_{min} < I_b < I_{ma}$, $$I_{mb} = \frac{1}{N_b}\sum I_b$$

wherein, $$I_{ma} = \frac{1}{N_a}\sum I_a,$$

$I_a$ is luminance of a pixel in the iris image, $I_{ma}$ is an average luminance of the iris image, $N_a$ is number of pixels in the iris image, and $I_{min}$ is a minimum luminance limit.

* * * * *

UNITED STATES PATENT AND TRADEMARK OFFICE
CERTIFICATE OF CORRECTION

PATENT NO. : 7,277,561 B2
APPLICATION NO. : 10/420813
DATED : October 2, 2007
INVENTOR(S) : S. Shin It is certified that error appears in the above-identified patent and that said Letters Patent is hereby corrected as shown below:

On the cover of the printed patent, at Item (57), Abstract, line 13, ";" should be --,--.

At column 10, line 51 (claim 2, line 13) of the printed patent, "41/10" should be --11/10--.

At column 11, line 8 (claim 4, line 15) of the printed patent,

"$$c = \frac{1}{2}\sqrt{(x_1 - x_2 - 2x_3)^2 + (y_1 - y_2 - 2y_3)^2}$$"

should be

--$$c = \frac{1}{2}\sqrt{(x_1 + x_2 - 2x_3)^2 + (y_1 + y_2 - 2y_3)^2}$$--.

At column 12, line 61 (claim 9, line 2) of the printed patent, "random" should be --randomly--.

At column 13, line 8 (claim 9, line 15) of the printed patent,

"$$c = \frac{1}{2}\sqrt{(x_1 - x_2 - 2x_3)^2 + (y_1 - y_2 - 2y_3)^2}$$"

should be

--$$c = \frac{1}{2}\sqrt{(x_1 + x_2 - 2x_3)^2 + (y_1 + y_2 - 2y_3)^2}$$--.

UNITED STATES PATENT AND TRADEMARK OFFICE
CERTIFICATE OF CORRECTION

PATENT NO. : 7,277,561 B2
APPLICATION NO. : 10/420813
DATED : October 2, 2007
INVENTOR(S) : S. Shin It is certified that error appears in the above-identified patent and that said Letters Patent is hereby corrected as shown below:

At column 15, line 8 (claim 14, line 12) of the printed patent,

" $$c = \frac{1}{2}\sqrt{(x_1 - x_2 - 2x_3)^2 + (y_1 - y_2 - 2y_3)^2}$$ "

should be

-- $$c = \frac{1}{2}\sqrt{(x_1 + x_2 - 2x_3)^2 + (y_1 + y_2 - 2y_3)^2}$$ --.

Signed and Sealed this

Nineteenth Day of August, 2008

JON W. DUDAS
*Director of the United States Patent and Trademark Office*